(12) United States Patent
Chattopadhyay et al.

(10) Patent No.: US 9,275,307 B2
(45) Date of Patent: Mar. 1, 2016

(54) METHOD AND SYSTEM FOR AUTOMATIC SELECTION OF ONE OR MORE IMAGE PROCESSING ALGORITHM (71) Applicant: Tata Consultancy Services Limited, Maharashtra (IN)

(72) Inventors: Tanushyam Chattopadhyay, West Bengal (IN); Ramu Vempada Reddy, West Bengal (IN); Utpal Garain, West Bengal (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 0 days.

(21) Appl. No.: 14/286,303

(22) Filed: May 23, 2014

(65) Prior Publication Data

US 2014/0348420 A1    Nov. 27, 2014

(30) Foreign Application Priority Data

May 24, 2013   (IN) .......................... 1840/MUM/2013

(51) Int. Cl.
*G06K 9/66*    (2006.01)
*G06K 9/48*    (2006.01)
*G06K 9/34*    (2006.01)
*G06K 9/38*    (2006.01)
*G06K 9/46*    (2006.01)

(52) U.S. Cl.
CPC .. *G06K 9/66* (2013.01); *G06K 9/34* (2013.01); *G06K 9/38* (2013.01); *G06K 9/4652* (2013.01); *G06K 9/481* (2013.01); *G06K 2209/01* (2013.01)

(58) Field of Classification Search
None
See application file for complete search history.

(56) References Cited

U.S. PATENT DOCUMENTS

| 5,291,563 | A  | * | 3/1994  | Maeda ......................... 382/103 |
| 7,953,265 | B2 |   | 5/2011  | Sirohey et al. |
| 7,995,243 | B2 | * | 8/2011  | Sakaue ........................ 358/3.06 |
| 8,160,347 | B2 |   | 4/2012  | Chaudhuri |
| 8,718,376 | B2 | * | 5/2014  | Yim et al. ..................... 382/190 |
| 8,965,104 | B1 | * | 2/2015  | Hickman et al. .............. 382/153 |
| 2006/0224539 | A1 | * | 10/2006 | Zhang et al. .................... 706/20 |
| 2007/0076934 | A1 | * | 4/2007  | Krishnan et al. .............. 382/128 |
| 2007/0133851 | A1 | * | 6/2007  | Sirohey et al. ................ 382/128 |
| 2007/0196013 | A1 | * | 8/2007  | Li ...................... G06K 9/00456 382/159 |
| 2010/0014755 | A1 | * | 1/2010  | Wilson ............... G06K 9/00604 382/173 |
| 2011/0172514 | A1 | * | 7/2011  | Lee ....................... G06F 19/345 600/408 |
| 2013/0315479 | A1 | * | 11/2013 | Paris .................... G06K 9/6256 382/159 |

OTHER PUBLICATIONS

Xia Yong, Dagan Feng and Zhao Rongchun, "Optimal Selection of Image Segmentation Algorithms Based on Performance Prediction", 2004.
D. W. Paglieroni, "A Self-Calibrating Multi-Band Region Growing Approach to Segmentation of Single and Multi-Band Images" Dec. 20, 2002.

* cited by examiner

*Primary Examiner* — Stephen R Koziol
*Assistant Examiner* — Pinalben Patel
(74) *Attorney, Agent, or Firm* — Thompson Hine LLP (57) ABSTRACT

Disclosed is a method and system for automatic algorithm selection for image processing. The invention discloses the method and system for automatically selecting the correct algorithm(s) for a varying requirement of the image for processing. The selection of algorithm is completely automatic and guided by a plurality of machine learning approaches. The system here is configured to pre-process plurality of images for creating a training data. Next, the test image is extracted, pre-processed and matched for assessing the best possible match of algorithm for processing.

12 Claims, 8 Drawing Sheets

METHOD AND SYSTEM FOR AUTOMATIC SELECTION OF ONE OR MORE IMAGE PROCESSING ALGORITHM

RELATED APPLICATIONS

This application claims the benefit of Indian patent application No. 1840/MUM/2013, filed May 24, 2013.

TECHNICAL FIELD

The present subject matter described herein, in general, relates to image processing, and more particularly to automatic selection of one or more image processing algorithms.

BACKGROUND

Image processing involves processing of an image such as a photograph or a video frame to generate a processed image, or a set of characteristics or parameters related to the image as the output of the processing.

The processing of an image may involve various tasks like binarization, page segmentation, skew correction, character recognition, and page layout analysis. These tasks can be accomplished by various conventional known algorithms available in the market. However, a major problem arises in intra image variations wherein a single algorithm may not produce acceptable or desired results. Further, no single algorithm known can process the images well under all conditions.

Moreover, in the conventional approach, an algorithm or a technique, and its corresponding parameters are selected based on user feedback in order to obtain a desired processed image. The major limitation of the conventional approach is that it involves manual intervention which makes the system slow and the final result being sensitive to the human perception. Though there exist various approaches suggesting a suitable algorithm for image processing using machine learning approach, but nevertheless these do not address the challenges faced for intra image variations. Therefore, a need exists for automatically identifying one or more algorithms from a plurality of algorithms, which matches the requirement of an image during processing. Certain embodiments of the present invention are intended to meet these needs and other objectives that will become apparent from the description and drawings set forth below.

SUMMARY

This summary is provided to introduce aspects related to systems and methods for automatic selection of one or more image processing algorithm and the aspects are further described below in the detailed description. This summary is not intended to identify essential features of the claimed subject matter nor is it intended for use in determining or limiting the scope of the claimed subject matter.

In one implementation, an image processing system for automatic selection of one or more pre-stored image processing algorithms for image processing is disclosed. The image processing system comprises a processor and a memory coupled to the processor for executing a plurality of modules present in the memory. The plurality of modules comprises a receiving module, an image processing module, a comparing module, a recording module and a matching module. The receiving module is configured to receive at least one image. The image processing module is configured to segment the image received into plurality of image segments and further perform one or more pre-stored algorithms from plurality of image processing algorithms upon each of the image segment, in order to obtain plurality of image processing algorithm output. The comparing module, on the other hand, is configured to compare each of the image processing algorithms output against a predetermined threshold image processing output score. The recording module is configured to record the image processing algorithms, those exceeding the predetermined threshold image processing score, along with corresponding one or more image segments and associated feature vectors as a training pair. The matching module is configured to match and thereby select one or more potentially matching image processing algorithm from the training pair for each incoming pre-processed test image.

In one implementation, a computer implemented method for automatically selecting one or more algorithms in an image processing environment is disclosed. The method includes receiving at least one image, which is then segmented into a plurality of image segments. In the next step, one or more pre-stored algorithms from a plurality of image processing algorithms are performed upon each of the image segments in order to obtain plurality of image processing algorithm outputs. Further, each of the images processing algorithm outputs is compared against a predetermined threshold image processing output score. The image processing algorithm along with corresponding one or more image segments and associated feature vectors as a training pair is recorded for each of the image processing algorithms exceeding the predetermined threshold image processing output score. In the next step, one or more potentially matching image processing algorithms from the training pair for each incoming pre-processed test image is selected.

In yet another implementation, a computer readable medium embodying a program executable in a computing device for automatically selecting one or more algorithms in an image processing environment is disclosed. The program comprises a set of instructions for: receiving at least one image; segmenting the image received into plurality of image segments; performing one or more pre-stored algorithms from plurality of image processing algorithms upon each of the image segment in order to obtain plurality of image processing algorithm output; comparing each of the image processing algorithm output against a predetermined threshold image processing output score; for each of the image processing algorithm exceeding the predetermined threshold image processing output score, recording the image processing algorithm along with corresponding one or more image segments and associated feature vectors as a training pair; and selecting one or more potentially matching image processing algorithm from the training pair for each incoming pre-processed test image, wherein the potentially matching image processing algorithm is selected by matching a test segment of the incoming test image and a feature vector associated with the test segment with the one or more segments recorded and feature vectors associated with the one or more segments recorded.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods for automatically selecting one or more algorithms in an image processing environment are disclosed.

In one implementation, an image processing system comprises a processor and a memory coupled to the processor for executing a plurality of modules present in the memory. The plurality of modules comprises a receiving module, an image processing module, a comparing module, a recording module and a matching module. The receiving module is configured to receive at least one image. The image processing module is configured to segment the image received into a plurality of image segments. The image processing module is further configured to perform image processing upon each of the image segments using one or more pre-stored algorithms from a plurality of image processing algorithms, in order to obtain a plurality of image processing algorithm outputs. The comparing module, on the other hand, is configured to compare each of the image processing algorithm's output against a predetermined threshold image processing output score. The recording module is configured to record the image processing algorithm along with corresponding one or more image segments and associated feature vectors as a training pair. The matching module is configured to match one or more potentially matching image processing algorithms from the training pair for each incoming pre-processed test image.

In one implementation, the image may be received by the image processing system. The received image may be segmented into a plurality of segments using known algorithms for segmentation. A plurality of pre-stored algorithms can be applied on the plurality of segments. Further, each result obtained by executing the algorithms is compared with a predetermined threshold image processing output score. In the next step, the image processing algorithm along with corresponding one or more image segments and their associated feature vectors as a training pair is recorded for each of the image processing algorithms exceeding the predetermined threshold image processing output score. Further, one or more potentially matching image processing algorithms from the training pair for each incoming pre-processed test image is selected.

In one implementation, the pre-processed test image is obtained by receiving the test image which is further segmented into a plurality of segments. A plurality of features is then extracted from the plurality of segments.

While aspects of the described system and method for automatically selecting one or more algorithms in an image processing environment may be implemented in any number of different computing systems, environments, and/or configurations, the embodiments are described in the context of the following exemplary system.

Figure 1:
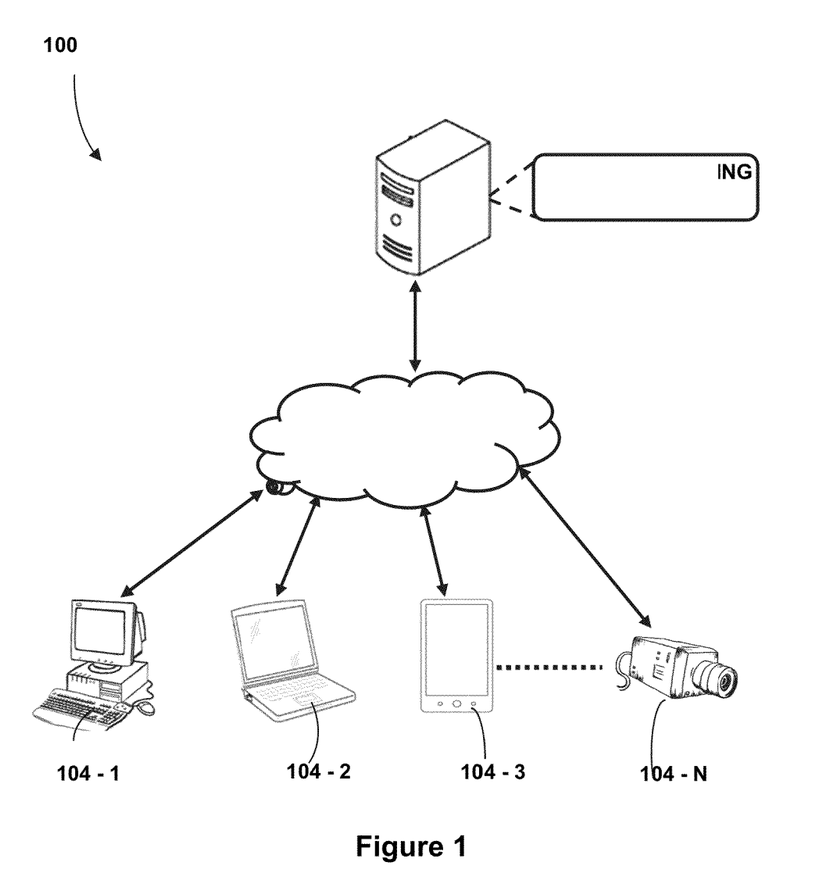
FIG. 1 illustrates a network implementation of an image processing system in accordance with an embodiment of the present subject matter.

Referring now to FIG. 1, a network implementation 100 of image processing system 102 for automatically selecting one or more algorithms in an image processing environment is illustrated, in accordance with an embodiment of the present subject matter. In one embodiment, the image processing system 102 is configured to receive the image. The received image is segmented into a plurality of segments using known algorithms for segmentation. A plurality of pre-stored algorithms is applied on the plurality of segments. Further, each result obtained by executing the algorithms is compared with a predetermined threshold image processing output score. In the next step, the image processing algorithm along with corresponding one or more image segments and associated feature vectors as a training pair is recorded for each of the image processing algorithm exceeding the predetermined threshold image processing output score. Further, one or more potentially matching image processing algorithms from the training pair for each incoming pre-processed test image is selected.

Although the present subject matter is explained considering that the image processing system 102 is implemented on a server, it may be understood that the image processing system 102 may also be implemented in a variety of computing systems, such as a laptop computer, a desktop computer, a notebook, a workstation, a mainframe computer, a server, a network server, and the like. It will be understood that the image processing system 102 may be accessed by multiple users through one or more user devices 104-1, 104-2, 104-3 . . . 104-N, collectively referred to as user 104 hereinafter, or applications residing on the user devices 104. Examples of the user devices 104 may include, but are not limited to, a portable computer 104-2, a personal digital assistant 104-3, a handheld device 104-N, and a workstation 104-1. The user devices 104 are communicatively coupled to the image processing system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
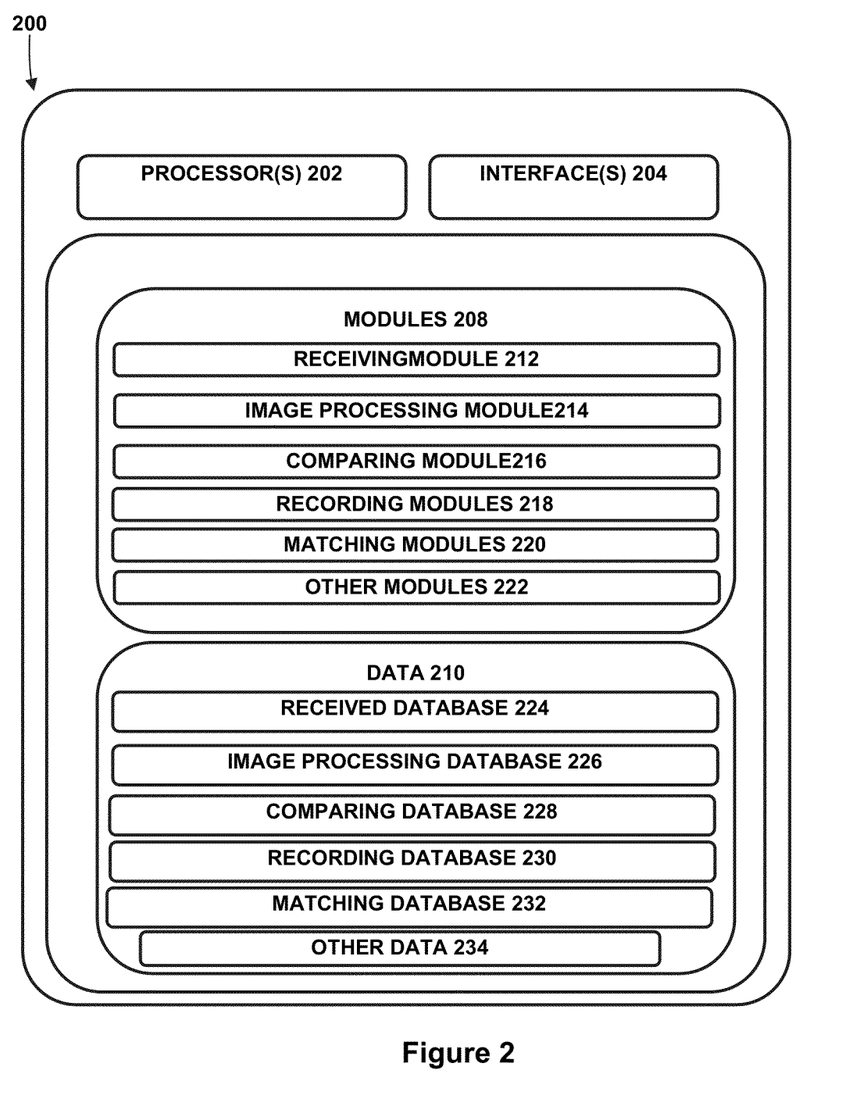
FIG. 2 illustrates the image processing system, in accordance with an embodiment of the present subject matter.

Referring now to FIG. 2, the image processing system 102 is illustrated in accordance with an embodiment of the present subject matter. In one embodiment, the image processing system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the image processing system 102 to interact with a user directly or through the client devices 104. Further, the I/O interface 204 may enable the image processing system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a receiving module 212, an image processing module 214, a comparing module 216, a recording module 218, a matching module 220 and other modules 222. The other modules 222 may include programs or coded instructions that supplement applications and functions of the image processing system 102.

The data 210, amongst other things, serves as a repository for storing data processed, received, and generated by one or more of the modules 208. The data 210 may also include a received database 224, an image processing database 226, a comparing database 228, a recording database 230, a matching database 232 and other data 234. The other data 234 may include data generated as a result of the execution of one or more modules in the other module 222.

In one implementation, a user may use the client device 104 to access the image processing system 102 via the I/O interface 204. The user may register them using the I/O interface 204 in order to use the image processing system 102. The working of the image processing system 102 may be explained in detail in FIGS. 3 and 4 explained below. The image processing system 102 may be used for automatically selecting one or more algorithms in an image processing environment. The actual working of the image processing system 102 is explained in the below section.

Figure 3:
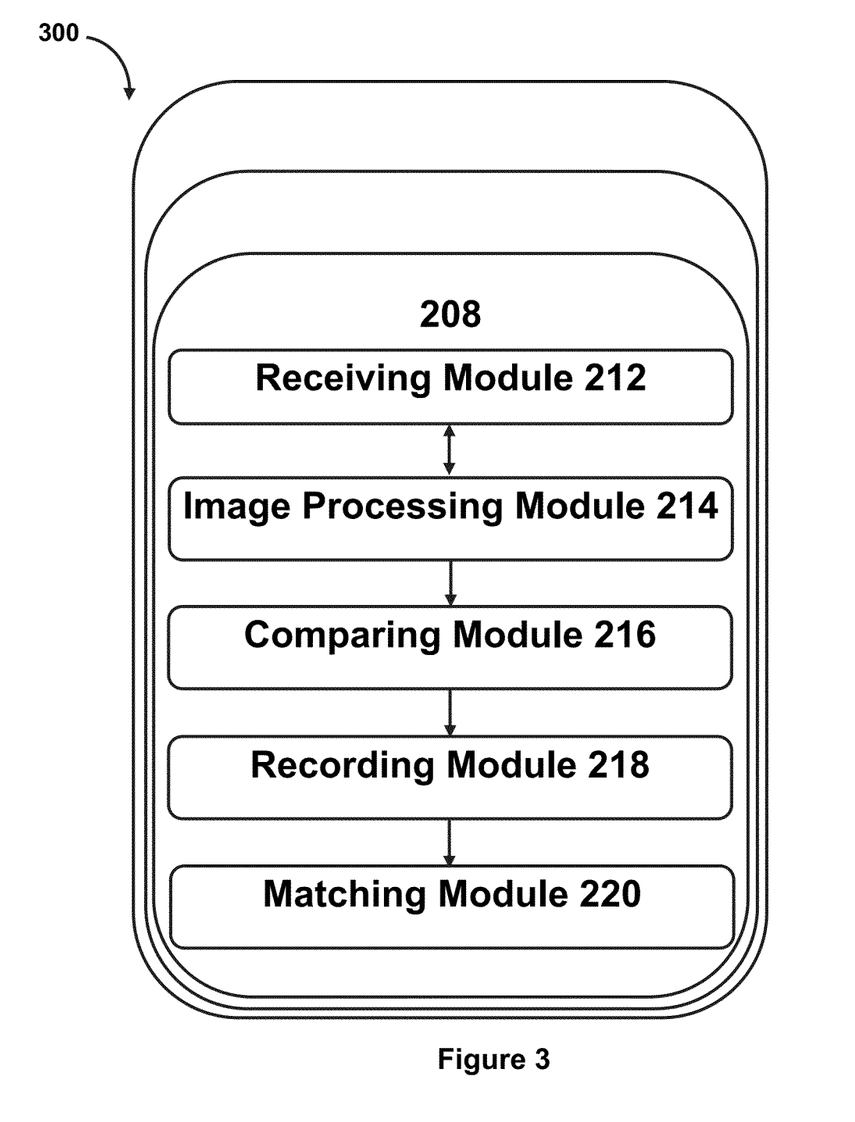
FIG. 3 illustrates a block diagram of the image processing system, in accordance with an embodiment of the present subject matter.

Referring to FIG. 3, a block diagram 300 describes a detailed working of the image processing system 102, in accordance with an embodiment of the present subject matter.

In one implementation, the modules 208 include routines, programs, objects, components, data structures, etc., which perform particular tasks or implement particular abstract data types. In one implementation, the modules 208 may include a receiving module 212, an image processing module 214, a comparing module 216, a recording module 218, a matching module 220 and other modules 222 (shown in FIG. 2). The other modules 222 may include programs or coded instructions that supplement applications and functions of the image processing system 102.

Receiving Module 212

In one implementation the receiving module 212 is configured to receive a plurality of images for processing. The images received by the receiving module 212 are obtained from various devices 104 interacting with the image processing system 102.

In one example, the image received may be in a file format that may include, but is not limited to, JPEG/JFIF image, JPEG 2000 image, Exif image, TIFF image, RAW and the like.

In one implementation, the receiving module 212 may receive a pre-processed image from the device 104. The pre-processed image may include, but is not limited to, a plurality of features extracted from the image.

In one example, the pre-processing is obtained by receiving the test image. Segmenting the test image received into a plurality of image segments. The plurality of image segments is further utilized for extracting a plurality of features from the segments.

In one implementation, data related to the receiving module 212 is stored in the receiving database 224. In one example, the receiving database 224 may include, but is not limited to, the plurality of images received for processing, the pre-processed image, plurality of features extracted from the plurality of images.

Image Processing Module 214

In one implementation the image processing module 214 is configured to segment the image received into plurality of image segments and perform one or more pre-stored algorithms from a plurality of image processing algorithms upon each of the image segments in order to obtain a plurality of image processing algorithm outputs.

In one implementation the image processing module 214 segments the image received into plurality of image segments using known segmentation methods that may be pre-stored in the image processing system 102. In one example, the known segmentation methods may include, but is not limited to, a thresholding method, a clustering method, a compression-based method and the like.

In one implementation, the plurality of image segments may include, but is not limited to, overlapping segments or non-overlapping segments, or a combination thereof. The image segments are further processed using one or more pre-stored algorithms from the plurality of image processing algorithms in order to obtain a plurality of image processing algorithm outputs.

In one example, the one or more pre-stored algorithms may include, but is not limited to, binarization algorithms, noise reduction algorithms, segmentation algorithms, character recognition algorithms, page layout detection, page layout segmentation, and by any of the existing image processing algorithms known in the art or hereinafter developed.

In one example, the plurality of image processing algorithm outputs obtained from processing the image may include different regions of the same image along with the algorithm predicted for a respective region. In another example the plurality of image processing algorithm outputs may include either an image or a set of characteristics or parameters related to an image.

In one implementation, data related to the image processing module 214 is stored in the image processing database 226. In one example, the image processing database 226 may include, but is not limited to, the plurality of known segmentation methods, the plurality of image processing algorithms, the plurality of image segments and the like.

Comparing Module 216

In one implementation the comparing module 216 is configured to compare each of the image processing algorithm outputs against a predetermined threshold image processing output score. The output obtained from the image processing module 216 is compared with the predetermined threshold image processing output score.

In one example, the output obtained from the image processing module 216 is compared with a groundtruth (GT). The GT is calculated using the techniques that may include, but is not limited to, manually annotated data or any of the GT techniques known in the art or hereinafter developed.

In one implementation, the comparing module 216 may determine the predetermined threshold image processing output score as a groundtruth that is characteristic for each training pair. Further, data related to the comparing module 216 is stored in the comparing database 228. In one example, the comparing database 228 may include, but is not limited to, the images processing algorithm output, the predetermined threshold image processing output score, groundtruth (GT) and the like.

Recording Module 218

In one implementation, the recording module 218 is configured to record the image processing algorithm along with corresponding one or more image segments and associated feature vectors as a training pair based on the output of the comparing module 216.

In one implementation the image processing algorithm with corresponding one or more image segments may be obtained from the comparing module 216. The associated feature vectors related to one or more image segments is obtained by extracting image moment features for each of the image segment, wherein the image moment features comprise of a mean, a variance, and a skew, corresponding to the image segment. Further, the feature vectors are formed based on the image moment features for each of the image segments, wherein the feature vectors are obtained using HSV quantization or by any of the techniques known in the art or hereinafter developed. In one example, the feature vector of length 265 is extracted from each image received.

In one implementation the training pair may include, but is not limited to, image processing algorithm along with corresponding one or more image segments.

In one implementation, data related to the recording module 218 is stored in the recording database 230. In one example, the recording database 230 may include, but is not limited to, the image processing algorithm along with corresponding one or more image segments and associated feature vectors as a training pair, the groundtruth (GT) determined as a characteristic for each training pair and the like.

Matching Module 220

In one implementation, the matching module 220 is configured to match one or more potentially matching image processing algorithm from the training pair for each incoming pre-processed test image. The pre-processed test image is obtained by receiving the test image, and segmenting the test image received into a plurality of image segments. The plurality of image segments is further utilized for extracting a plurality of features from the segments.

In one implementation the plurality of features from the segments may be extracted by the methods well known to the person practicing and skilled in the art or hereinafter developed. However the disclosed subject matter shall be understood to include other methods of image segmentation that may be well known to the person skilled in the art.

In one example, the image received may be in a file format that may include, but is not limited to, JPEG/JFIF image, JPEG 2000 image, Exif image, TIFF image, RAW and the like.

In one example, the image pre-processing may be performed in the image processing system 102 or at the device 104.

In one implementation, data related to the matching module 220 is stored in the matching database 232. In one example, the matching database 232 may include, but is not limited to, the pre-processed test image, image processing algorithm and the like.

Figure 4:
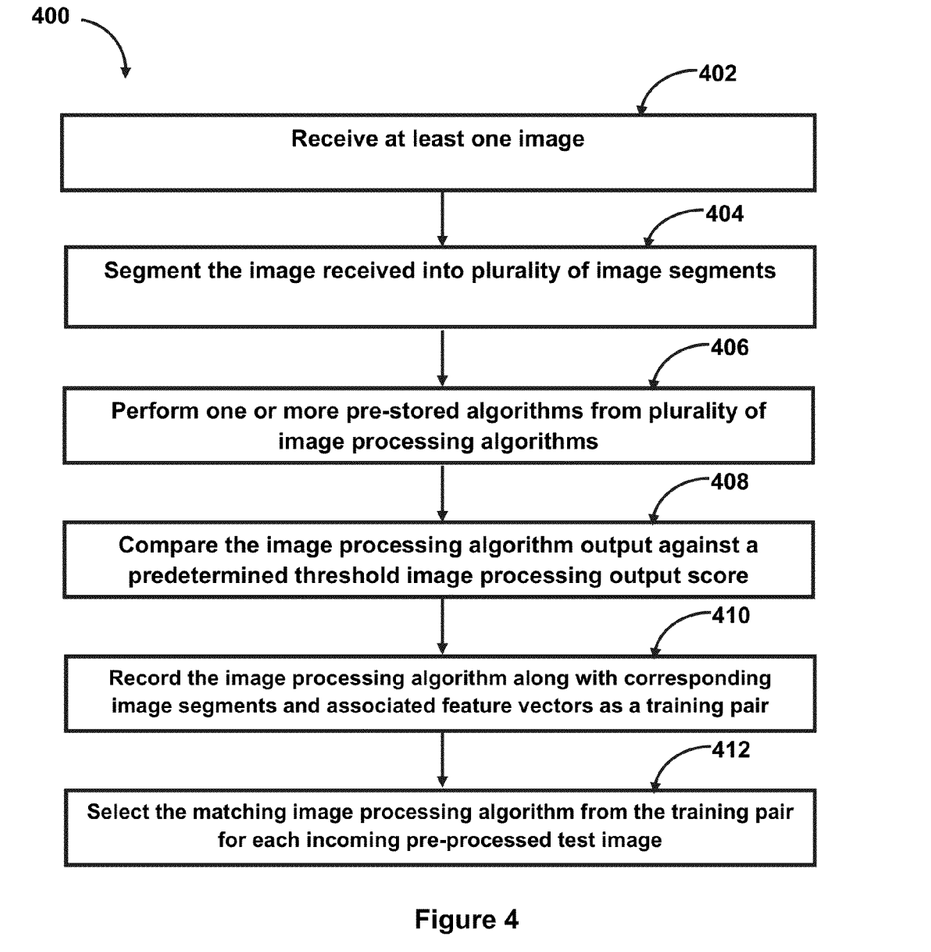
FIG. 4 illustrates a method for automatically selecting one or more algorithms in an image processing environment, in accordance with an embodiment of the present subject matter.

Referring now to FIG. 4, one embodiment of a method for automatically selecting one or more algorithms in an image processing environment is illustrated.

The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described image processing system 102.

At block 402, at least one image is received. The images received are obtained from various devices 104 interacting with the image processing system 102.

At block 404, the image received is segmented into plurality of image segments, which is performed by any of the existing image segmentation techniques known in the art or hereinafter developed. However the disclosed subject matter shall be understood to include other methods of image segmentation that may be well known to the person skilled in the art.

At block 406, the one or more pre-stored algorithms from the plurality of image processing algorithms is processed upon each of the image segments in order to obtain a plurality of image processing algorithm outputs. In one example, the image processing algorithm may include, but is not limited to, binarization algorithms, noise reduction algorithms, segmentation algorithms, and/or character recognition algorithms.

At block 408, the image processing algorithm output is compared against a predetermined threshold image processing output score. In one example, the predetermined threshold image processing output score is a groundtruth (GT) that is characteristic for each training pair.

At block 410, the image processing algorithm along with corresponding image segments and associated feature vectors as a training pair is recorded. In one implementation the associated feature vectors related to one or more image segments is obtained by extracting image moment features for each of the image segments, wherein the image moment features comprise a mean, a variance, and a skew, corresponding to the image segment. Further, the feature vectors are formed based on the image moment features for each of the image segments, wherein the feature vectors are obtained using HSV quantization.

At block 412, the matching image processing algorithm from the training pair is selected for each incoming pre-processed test image for further processing. In one implementation the pre-processed test image is obtained by receiving the test image and segmenting the test image into a plurality of image segments. The plurality of image segments is further utilized for extracting a plurality of features from the segments.

Figure 5:
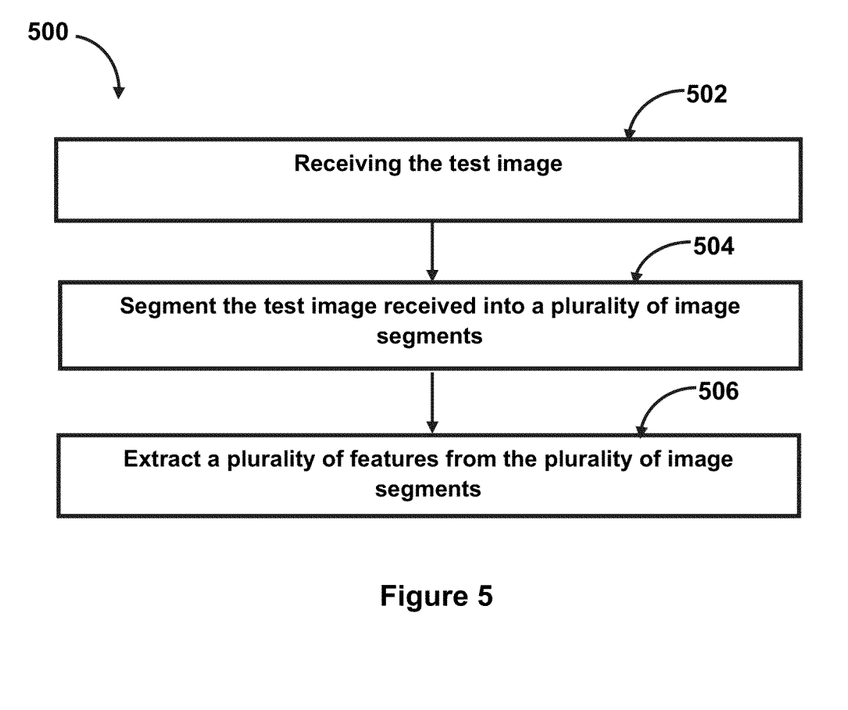
FIG. 5 illustrates a method for obtaining the pre-processed test image, in accordance with an embodiment of the present subject matter.

Referring now to FIG. 5, one embodiment of a method for obtaining the pre-processed test image 500 is illustrated. The method 500 may be performed inside the image processing system 102 or inside the device 104.

At step 502, the test is received. In one example, the image received may be in a file format that may include, but is not limited to, JPEG/JFIF image, JPEG 2000 image, Exif image, TIFF image, RAW and the like.

At step 504, the test image received is segmented into a plurality of image segments. In one example the segmentation is performed by any of the existing image segmentation techniques known in the art or hereinafter developed. However, the disclosed subject matter shall be understood to include other methods of image segmentation that may be well known to the person skilled in the art.

At step 506, the plurality of image segments are further utilized for extracting a plurality of features from the image segments. In one example the extraction is performed by any of the existing image extraction techniques known in the art or hereinafter developed. However, the disclosed subject matter shall be understood to include other methods of image extraction that may be well known to the person skilled in the art.

Figure 6:
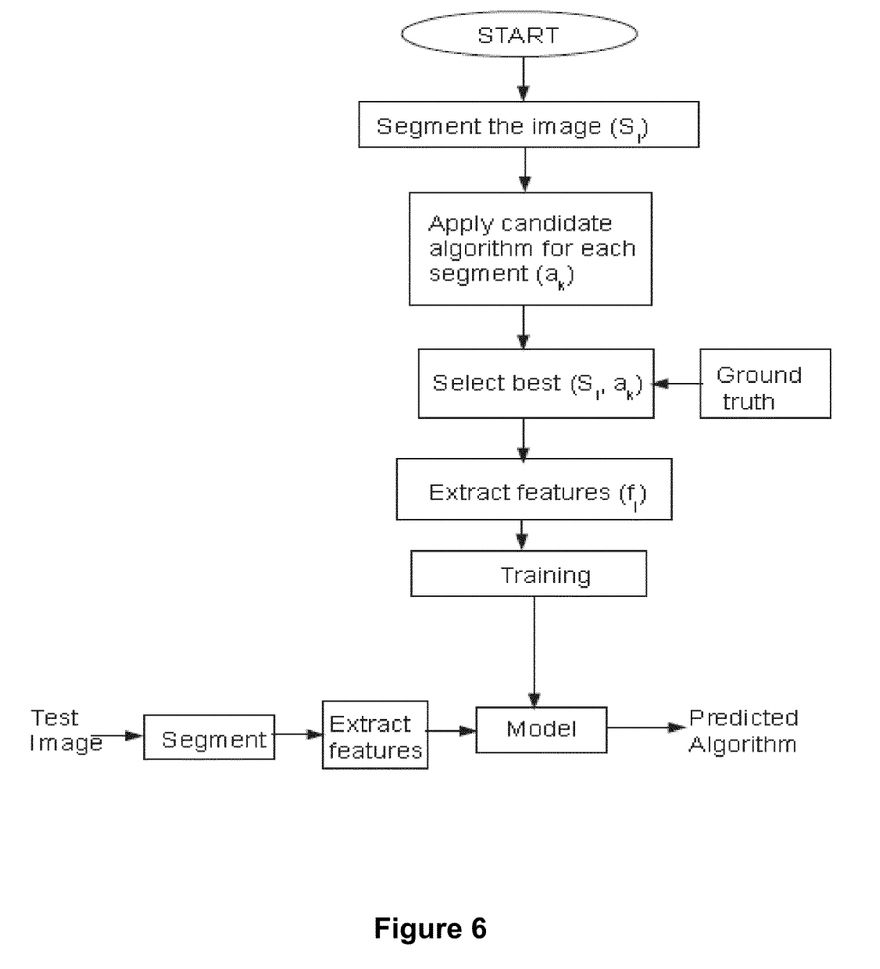
FIG. 6 illustrates a flowchart for the image processing, in accordance with an embodiment of the present subject matter.

Referring now to FIG. 6, one embodiment of a flowchart for the image processing is illustrated.

In one implementation, the image may be received by the image processing system. The received image is segmented into a plurality of segments using known algorithms for segmentation. A plurality of pre-stored algorithms is applied on the plurality of segments. Further, each result thereof is compared with a predetermined threshold image processing output score which may be groundtruth (GT). In the next step, the image processing algorithm along with corresponding one or more image segments and associated feature vectors, as a training pair, is recorded for each of the image processing algorithms exceeding the predetermined threshold image processing output score.

Further, at least one test image is received by the image processing system. The received test image is segmented into a plurality of segments using known algorithms for segmentation. The plurality of features from the test image are extracted using the known extraction algorithms. At last, one or more potentially matching image processing algorithms from the training pair for each incoming pre-processed (feature extracted) test image is selected.

Figure 7:
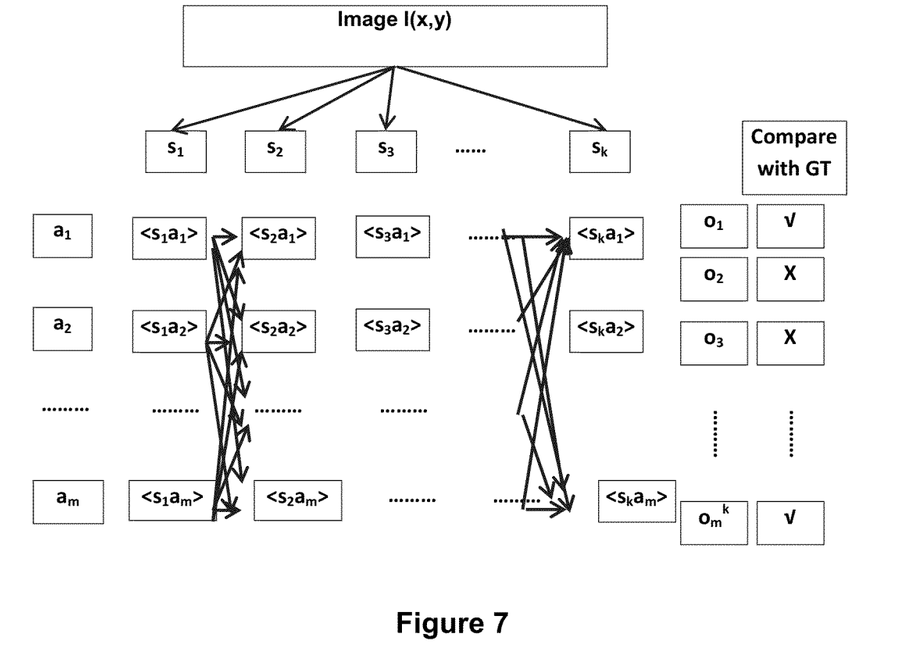
FIG. 7 illustrates the exemplary image processing system and its working, in accordance with an embodiment of the present subject matter.

The detailed working of the flow chart is explained in FIG. 7.

Referring now to FIG. 7, the exemplary image processing system and its working is described, in accordance with an embodiment of the present subject matter.

Let $T=\{t_1, t_2 \ldots t_n\}$ be the set of n training images. For each training image, $t_i$ an optical character recognition (OCR'd) output $g_i$ is obtained. Let A be a set of m binarization algorithms $A=\{a_1, a_2 \ldots a_n\}$ that are pre-stored in the image processing system. Each image is divided into k (overlapping or non-overlapping) segments $(s_1, s_2 \ldots s_k)$, i.e.

$$t_i = \cup_{i=1}^{k} s_i$$

Further, each of the m algorithms work on each of the k segments. Let $r_{ij}$ denote the binarization result from the algorithm $a_j$ working on segment $s_i$. The binarization of the complete image is obtained by:

$$\cup_{i=1}^{k} r_{ij}$$

As j can vary from 1 to m, there are $k^m$ different binarization results for a training image.

In one example, if OCR recognizes each of these $k^m$ images, it generates an equivalent number of OCR outputs $(o_1, o_2 \ldots o_k{}^m)$. Each of these $o_i$'s is then compared with the corresponding groundtruth $(GT)g_i$, and if a match is found, then the series of algorithms that generates $o_i$ is a right set of k binarization algorithms (all the k algorithms are not necessarily distinct) working on the k segments. Let $B=\{b_1, b_2 \ldots b_k\}$ be the set of these k algorithms working on $(s_1, s_2 \ldots s_k)$ segments. In one example, the binarization algorithms may include, but is not limited to, an Otsu's method, Savoula method, Niblack method, Wolf Binarization Techniques and the like.

It is to be noted that all $b_i$, $\in$ A and $b_i$ can be equal to $b_j$ where, i=j. Hence, there is a one to one correspondence between $b_i$ and $s_i$ and we can claim that $b_i$ is the right algorithm for binarization of $s_i$.

The above formulation is used for generating training pairs <image-segment, binarization-algorithm>, i.e. $<s_i, b_i>$. Each $(b_1, b_2 \ldots b_k)$ can be considered as a path generating an output and there are $m^k$ such paths. The model may generate many final images for which OCR output is correct. Therefore, from a single training image we can have many paths giving correct OCR results. All these paths are considered for generating the training instances. This process has been explained in FIG. 7. GT stands for groundtruth, tick marks corresponds to the path generating correct OCR outputs and cross marks indicates paths generating wrong OCR outputs. The paths generating wrong OCR outputs are ignored while preparing training data.

In one example, in order to train the machine following a machine learning algorithm (e.g. SVM), next each $s_i$ (which represents an image segment) results in the corresponding feature vector $f_i$. So finally $<f_i, b_i>$ pair is used for training.

In one example the feature vectors are obtained based on the image moment features for each of the image segments. The image moment features comprises of a mean $(E_x)$, a variance $(\sigma_x)$, and a skew $(z_x)$, corresponding to the image segment $(s_{xy})$. The features are extracted using the below mentioned equations:

$$E_x = \frac{1}{N} \sum_{y=1}^{N} s_{xy} \tag{1}$$

$$\sigma_x = \left[ \frac{1}{N} \sum_{y=1}^{N} (I_{xy} - E_x)^2 \right]^{\frac{1}{2}} \tag{2}$$

$$z_x = \left[ \frac{1}{N} \sum_{y=1}^{N} (I_{xy} - E_x)^3 \right]^{\frac{1}{3}} \tag{3}$$

In one example, the feature vector is obtained using HSV quantization.

Further, the training data is constructed by creating the <$f_i$, $b_i$> pair for each segment where $f_i$ is the feature vector.

In order to automatically select the algorithm for processing, a test image is received. The image processing system divides the test image into k segments and predicts corresponding binarization algorithm for each of the k segments. Features are extracted from each image segment and prediction is done by SVM which is trained on the training data set prepared before. Each image segment is then binarized using the predicted algorithm. The final binary version of a test image is obtained by simply OCRing of the binarized images for the segments.

In one example, a goal directed evaluation of the model is done by using an OCR to read the binarized version of the test images. If the OCR result matches the groundtruth corresponding to the test image then we consider it as a success in predicting the right binarization strategy for that test image.

Figure 8:
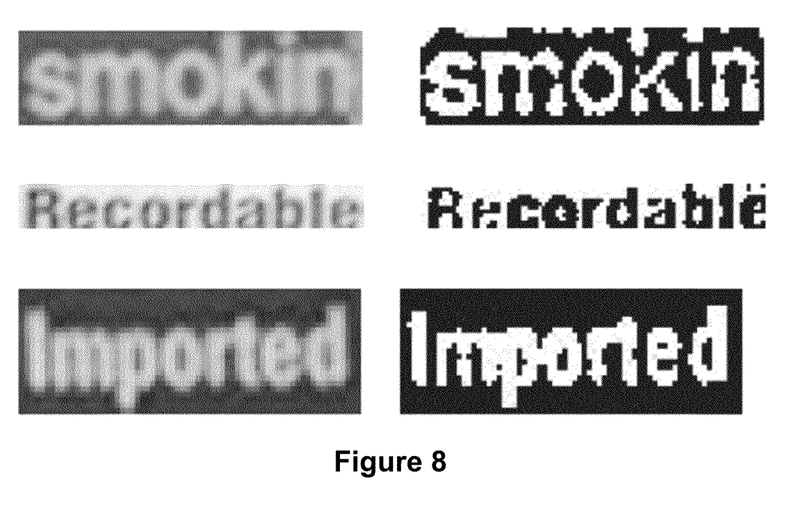
FIG. 8 illustrates the result of image processing system, in accordance with an embodiment of the present subject matter.

Referring to FIG. 8, the result of image processing system, in accordance with an embodiment of the present subject matter is described.

FIG. 8 shows three images in the left column where none of the binarization algorithms result in correct OCR when applied, whereas the right column is the output obtained by the proposed invention image processing system in order to achieve correct OCR output.

The principal advantage of the system(s) described above is that it is able to automatically identify one or more algorithms from a plurality of algorithms pre-stored, which matches the requirement of an image during processing.

The other advantage of the system(s) is that it is able to work efficiently even though there is an intra image variation wherein a single algorithm may not produce the acceptable result.

Another advantage is that the system(s) are efficient and fast. Presently, the manual intervention makes such systems slow.

Another advantage of the system(s) disclosed herein is that the final resulting image is less sensitive to error from human perception.

Another advantage is that the system(s) provides a suitable algorithm for image processing using machine learning approach, which also works for intra image variations.

Another advantage is that time consumption in the traditional image processing systems is greatly reduced due to the automated process described herein.

Although implementations for methods and systems for automatic algorithm selection for image processing have been described in language specific to structural features and/or methods, it is to be understood that the appended claims are not necessarily limited to the specific features or methods described. Rather, the specific features and methods are disclosed as examples of implementations for automatic algorithm selection for image processing.

What is claimed is:

1. A computer implemented method for automatically selecting one or more algorithms in an image processing environment, the method comprising:
   receiving at least one image;
   segmenting each image received into a plurality of image segments;
   performing one or more pre-stored algorithms from a plurality of image processing algorithms upon each of the image segments to obtain a plurality of image processing algorithm outputs;
   comparing each of the image processing algorithm outputs against a predetermined threshold image processing output score;
   for each of the image processing algorithm outputs exceeding the predetermined threshold image processing output score, recording the image processing algorithm along with corresponding one or more image segments and associated feature vectors as a training pair;
   receiving one or more incoming pre-processed test images; and
   selecting one or more potentially matching image processing algorithms from the training pair for each incoming pre-processed test image, wherein the potentially matching image processing algorithm is selected by matching a test segment of the incoming test image and a feature vector associated with the test segment with the one or more segments recorded and feature vectors associated with the one or more segments recorded.

2. The computer implemented method of claim 1, further comprising, to prepare the pre-processed test image:
   receiving a test image;
   segmenting the test image into a plurality of test image segments; and
   extracting a plurality of features from the plurality of test image segments.

3. The computer implemented method of claim 1, wherein the image segments include overlapping segments, non-overlapping segments, or a combination of thereof.

4. The computer implemented method of claim 1, wherein the plurality of image processing algorithms include binarization algorithms, noise reduction algorithms, segmentation algorithms, character recognition algorithms, page layout detection, page layout segmentation, or a combination thereof.

5. The computer implemented method of claim 1, further comprising obtaining the feature vectors by:
   extracting image moment features for each of the image segments, wherein the image moment features comprise a mean, a variance, and a skew corresponding to the image segment; and
   forming the feature vectors using HSV quantization.

6. The computer implemented method of claim 1, wherein the predetermined threshold image processing output score is a groundtruth determined as a characteristic for each training pair.

7. An image processing system for automatically selecting one or more algorithms in an image processing environment, the system comprising:
   a processor;
   a memory coupled to the processor, wherein the processor is configured to executing a plurality of modules stored in the memory, and wherein the plurality of modules comprise:
   a receiving module to receive at least one image;
   an image processing module that:
      segments each image received into a plurality of image segments; and
      performs one or more pre-stored algorithms from a plurality of image processing algorithms upon each of the image segments in order to obtain a plurality of image processing algorithm outputs;
   a comparing module that compares each of the image processing algorithm outputs against a predetermined threshold image processing output score;
   a recording module that records the image processing algorithms, those exceeding the predetermined threshold image processing output score, along with corresponding one or more image segments and associated feature vectors as a training pair; and a matching module that selects one or more potentially matching image processing algorithms from the training pair for an incoming pre-processed test image, wherein the potentially matching image processing algorithm is selected by matching a test segment of the incoming test image and a feature vector associated with the test segment with the one or more segments recorded and feature vectors associated with the one or more segments recorded.

8. image processing system of claim 7, wherein the image processing module processes the at least one image by performing one or more image processing algorithms selected from binarization algorithms, noise reduction algorithms, segmentation algorithms, character recognition algorithms, page layout detection, page layout segmentation, or a combination thereof.

9. The image processing system of claim 7, wherein the incoming pre-processed test image comprises a plurality of test image segments thereof and extracted features from each test image segment.

10. image processing system of claim 7, wherein the recording module extracts image moment features for each of the image segments, wherein the image moment features comprise a mean, a variance, and a skew corresponding thereto; and forms the feature vectors using HSV quantization.

11. The image processing system of claim 7, wherein the comparing module determines the predetermined threshold image processing output score as a groundtruth that is characteristic for each training pair.

12. A non-transitory computer readable medium embodying a program executable in a computing device for automatically selecting one or more algorithms in an image processing environment, the program comprising a set of instructions for:

receiving at least one image;

segmenting each image received into plurality of image segments;

performing one or more pre-stored algorithms from plurality of image processing algorithms upon each of the image segment in order to obtain plurality of image processing algorithm output;

comparing each of the image processing algorithm output against a predetermined threshold image processing output score;

for each of the image processing algorithm exceeding the predetermined threshold image processing output score, recording the image processing algorithm along with corresponding one or more image segments and associated feature vectors as a training pair; and selecting one or more potentially matching image processing algorithm from the training pair for each incoming pre-processed test image, wherein the potentially matching image processing algorithm is selected by matching a test segment of the incoming test image and a feature vector associated with the test segment with the one or more segments recorded and feature vectors associated with the one or more segments recorded.

* * * * *